United States Patent [19]

McNaney

[11] 4,097,123
[45] * Jun. 27, 1978

[54] LIGHT BEAM POSITION CONTROL SYSTEM

[76] Inventor: Joseph T. McNaney, 8548 Boulder Dr., La Mesa, Calif. 92041

[*] Notice: The portion of the term of this patent subsequent to Jun. 25, 1994, has been disclaimed.

[21] Appl. No.: 764,408

[22] Filed: Jan. 31, 1977

[51] Int. Cl.² ............................................. G02F 1/16
[52] U.S. Cl. ..................................... 350/353; 350/285
[58] Field of Search .............. 350/160 R, 161 W, 285

[56] References Cited
U.S. PATENT DOCUMENTS
4,004,847  1/1977  McNaney ...................... 350/161 W Primary Examiner—William L. Sikes

[57] ABSTRACT

The system herein includes an array of light beam reflecting surfaces and reflection control means for effecting changes in the position of a light beam along the scan-line output surface of the system with a much higher degree of sensitivity than is possible with the more well known line scan light beam deflection systems. This is accomplished primarily by allowing the reflection control means of the system to utilize scan angle magnifying means which are an inherent characteristic of the system in combination with repeated use of beam reflection control means therein.

3 Claims, 7 Drawing Figures

LIGHT BEAM POSITION CONTROL SYSTEM

BACKGROUND OF THE INVENTION

The invention herein relates to certain teachings disclosed in the applicant's U.S. patent application Ser. No. 655,152 filed 02/04/76 and now U.S. Pat. No. 4,004,847 and also to certain teachings to be found in applicant's U.S. patent application Ser. No. 729,310 filed 10/04/76, each including beam reflection and output control means which are incorporated in the present invention so as to increase still further the light reflection control sensitivity within such systems.

SUMMARY OF THE INVENTION

A beam of light, which can be in the form of radiant energy extending from ultraviolet, through the visible spectrum, to infrared, and preferably from a laser source, is directed along an input path toward a light admitting surface of an array of light reflecting surfaces of the system. Upon entering, light is directed, selectively, along any one of a plurality of optical paths each extending to a predetermined scan-line position of a light emitting output surface of the system. The light beam position control system includes an array of light reflecting surfaces each angularly oriented so as to establish an optical relationship one with respect to the other and to the admitting surface for allowing the beam to follow the plurality of paths each forming a helix of plural revolutions. In preferred embodiments of the invention light reflection control means are associated with one, or more, of the reflecting surfaces of the array of surfaces for effecting, selectively, the directing of light to a given scan-line position along the output surface. The path length of each of the optical paths is designed to provide a magnification of the redirecting capabilities of the control means and the use of more than one reflection control means along one or more of the reflecting surfaces will contribute to still further magnifications of the redirecting capabilities of the overall system. Different embodiments illustrated herein show, by way of example only, the means of meeting these objectives of the invention. The description which follows, when read in connection with the drawings hereof, will provide a better understanding of these objectives as well as other advantages included in the invention.

DESCRIPTION OF THE INVENTION

Figure 1:
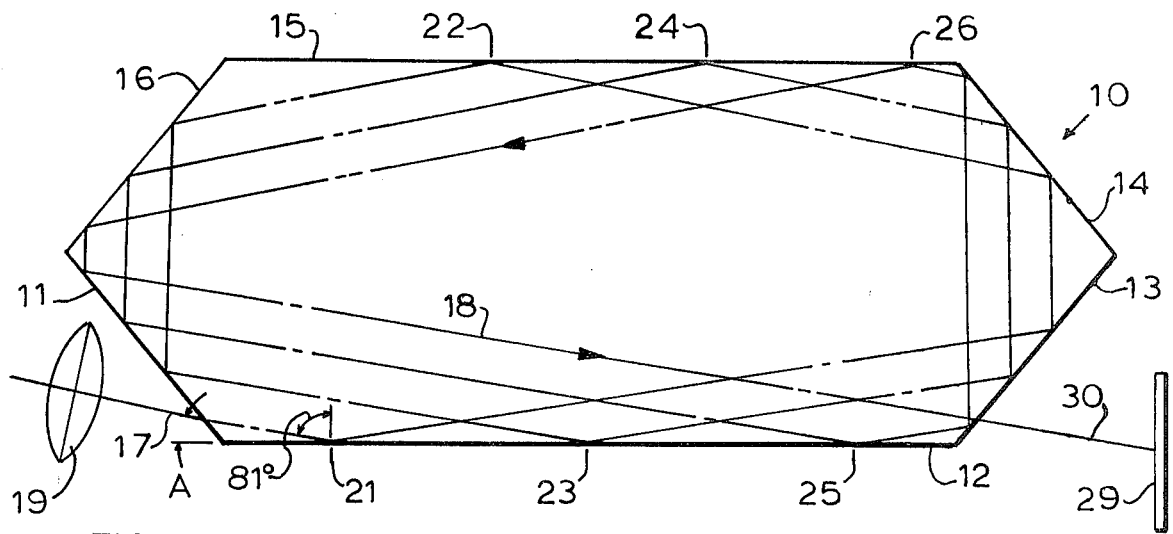
FIGS. 1 and 2 are diagram representations of an embodiment of the invention, showing first and second views thereof.
Figure 2:
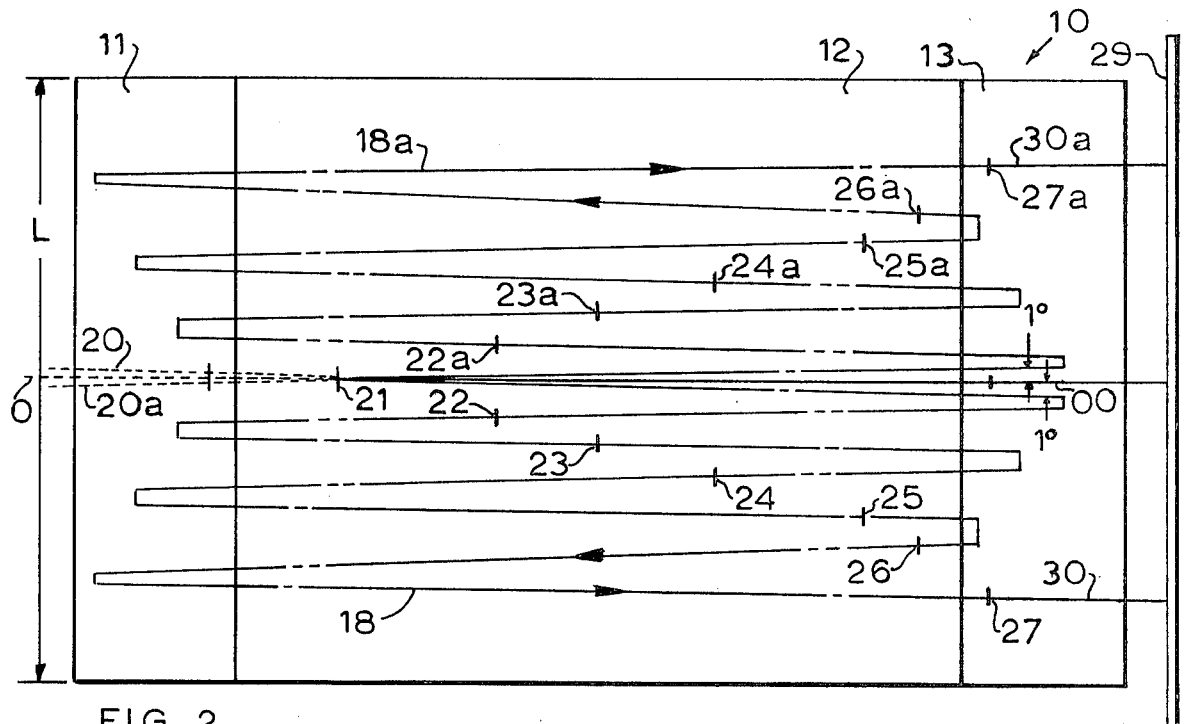

Referring now to FIGS. 1 and 2, a member 10, which can be regarded as being a light guide 10, is exemplified as having six light reflecting surfaces 11, 12, 13, 14, 15 and 16. Each, for example, can be understood as being a light reflecting surface of a member 10 of light conducting material bounded by an air environment surrounding the material. The invention can include the use of more, or less, than six reflecting surfaces as indicated, and also be supported independently of one another, but still meeting the objectives of the invention. Light will be described as being directed along a refraction-compensated input path 17 at the angle A, indicated in FIG. 1, admitted through the surface 11, and establishing an angle of incidence of 81° on the surface 12. The angular relationship of the surfaces 11 through 16 has been established whereby the angle of reflection of 81° from the initial point 21 of incidence on surface 12 will allow a beam of light to be directed toward surface 13, reflected therefrom toward surface 14, reflected therefrom toward surface 15 coincident with a point 22 thereon, reflected therefrom toward surface 16, reflected therefrom toward the surface 11 once again and coincident with a point 23 thereon. From this latter point 23 reflections will continue, forming a helix of plural revolutions, establishing angles of incidence and reflection at points 24 on surface 15, 25 on surface 12, 26 on surface 15, until having reached the surface 13 for the fourth time, but at an angle of incidence thereon (approx. 31°) sufficiently small enough to frustrate reflection therefrom, allowing light to follow a path 30 beyond the light reflecting limits of the member 10, from a point, or scan-line 27, of surface 13.

In FIG. 2, each of the angle of incidence and reflection points 21 through 26 are again shown, along the optical path 18 extending from the initial point 21 and ending at the scan-line 27, and also along a second optical path 18a extending from the initial point 21 and ending at the scan-line 27a. These paths 18 and 18a can represent first and second paths of plurality of such paths, each extending from the initial point 21 to a series of scan-line points along the length L of surface 13 extending from the point 27 to point 27a. These paths 18 and 18a can also represent two extremes in relation to an otherwise normal path, extending from positions 0 to 00, through the member 10. In establishing the path 18 light will be directed along an input path 20 and at an input angle of 1° in relation to the normal path 0, and in establishing the path 18a light will be directed along an input path 20a and at an opposite input angle of 1°, relative to the normal path 0. Changes from the input angle from 1° to 0° will provide corresponding changes in the output position of a beam of light along the scan-line between the positions 27 to 27a. These angular changes will be effected by light deflection control means external to the array of reflecting surfaces of member 10. A lens system 19 allows light entering member 10 to be focused so as to establish a sharply defined spot of light at the surface of a light beam responsive medium 29.

Figure 3:
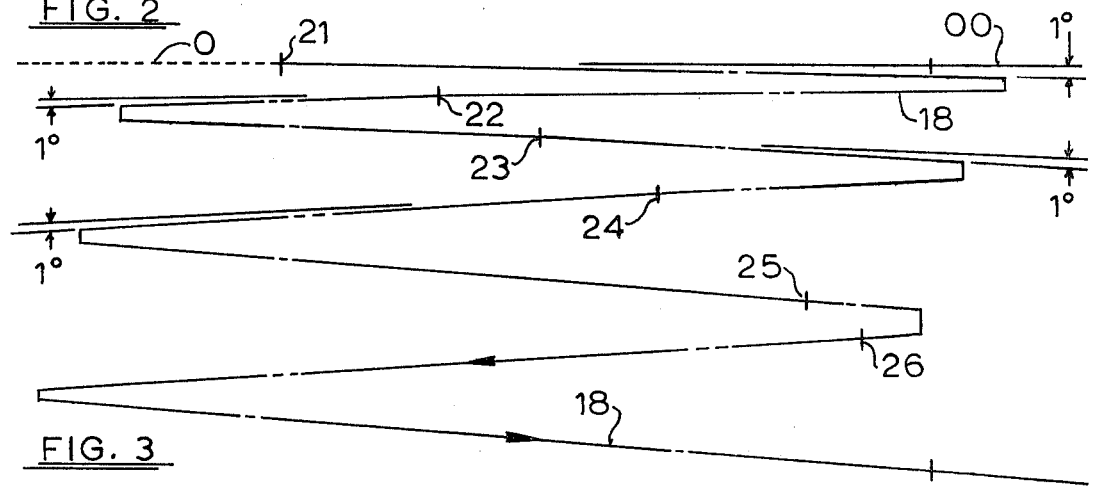
FIG. 3 is a diagram and further showing of a path light will be made to follow through the array of reflecting surfaces.
Figure 4:
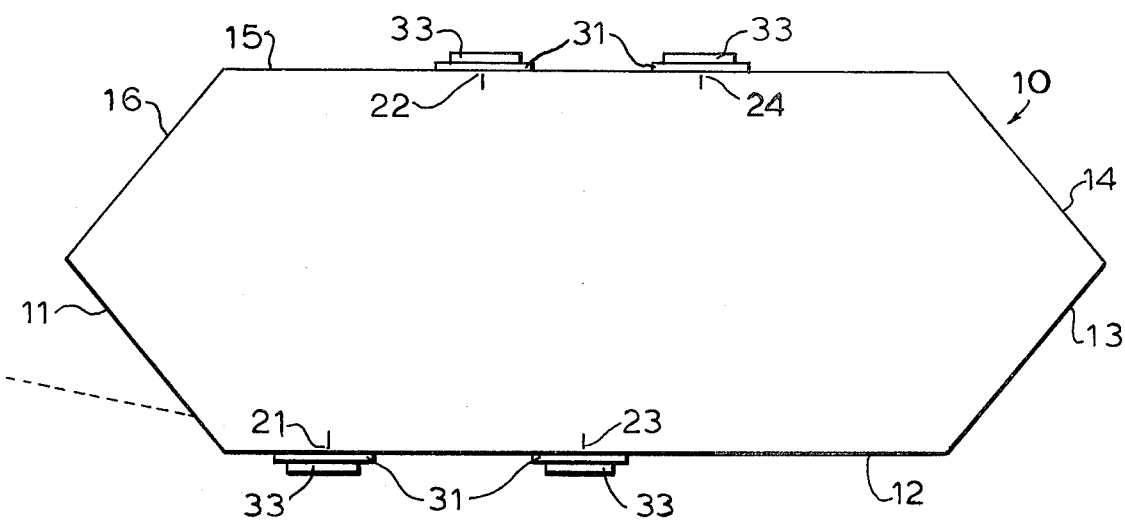
FIGS. 4 and 5 are diagram representations of first and second views of a further embodiment of the invention.
Figure 5:
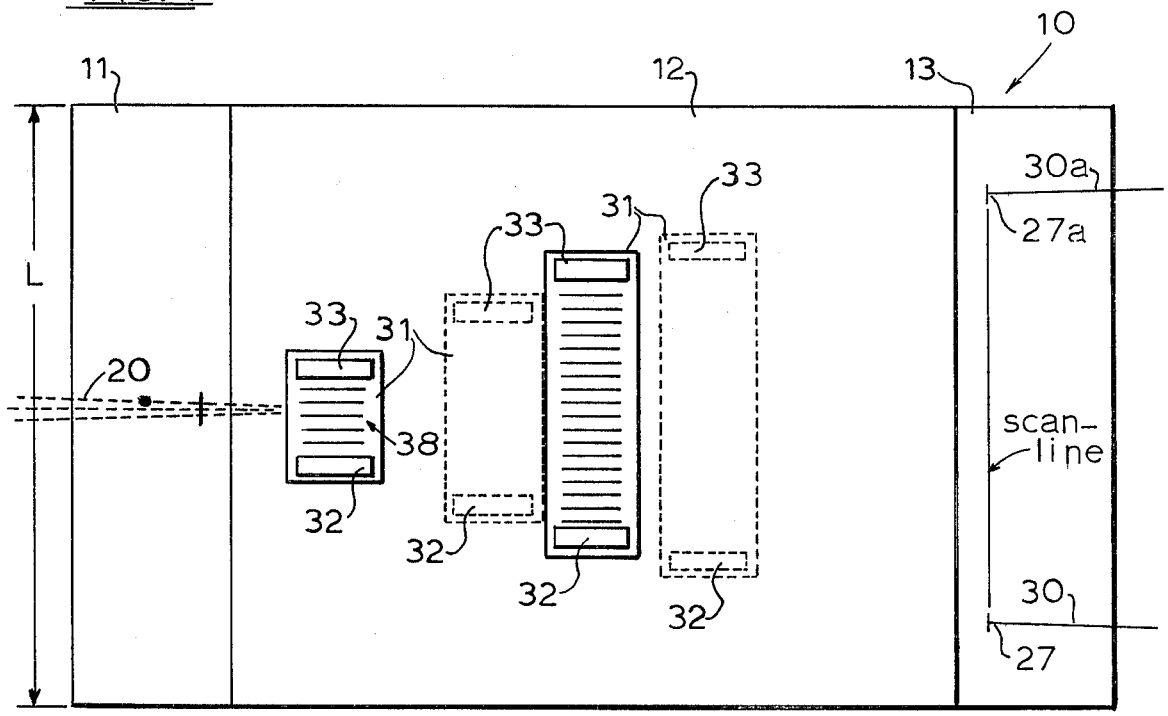

Another object of the invention is to utilize light reflection control means at one or more of the reflection points 21 through 26 so as to provide changes in the position of light along the scan-line 27. For example, reflection control means at the point 21 can be utilized to position the beam along the scan-line between the 00 position and the point 27, or between the 00 position and the point 27a, using maximum beam reflections of 1° for each direction. The use of reflection control means, as indicated in FIG. 3, at points 21, 22, 23 and 24, for example, will provide a greater overall displacement of the beam along the scan-line, by the addition of four individual 1° deflections of the beam.

Examples of the type of control means, and manner of their use, will be described in references to FIGS. 4, 5, 6 and 7. The member 10 material can be used as a substrate and support for a thin layer of light conducting material having a lower index of refraction than that of member 10 material. A layer 31 of such material is shown, for example, adjacent each of the control points 21, 22, 23 and 24 so as to provide an interface with material 10 at which the light reflecting characteristics may be changed sufficiently to effect a redirecting of light from these points in the direction of the length L of member 10, as opposed to any change in the path of the beam as illustrated and described in connection with FIG. 1. Such changes in light reflecting characteristics may be accomplished by various means, however, one of several means may include the use of acoustic wave generators, well known in the arts, and illustrated in FIG. 7. A few interdigital fingers of an electrode assembly 32 suitably supported on a layer 31 of lithium niobate, for example, and excited by a variable frequency voltage, will establish wave propagations in the layer 31 and corresponding light diffraction grating 38 for effecting the desired redirecting of light from a given one of the light reflection points. Such acoustic wave generators 32, in combination with an absorbing medium 33, are again shown in FIGS. 4 and 5 adjacent each of the reflection points 21, 22, 23 and 24. Light can be directed along an input path 20 and thereby use the scan-line position 27 as the initial beam position, and upon the application of the required variable frequency voltage to one of the generators, or to a combination of the four included in the system, the light beam at the output surface 13 can be positioned along the scan-line from the initial position 27 to a final position 27a.

Figures 6, 7:
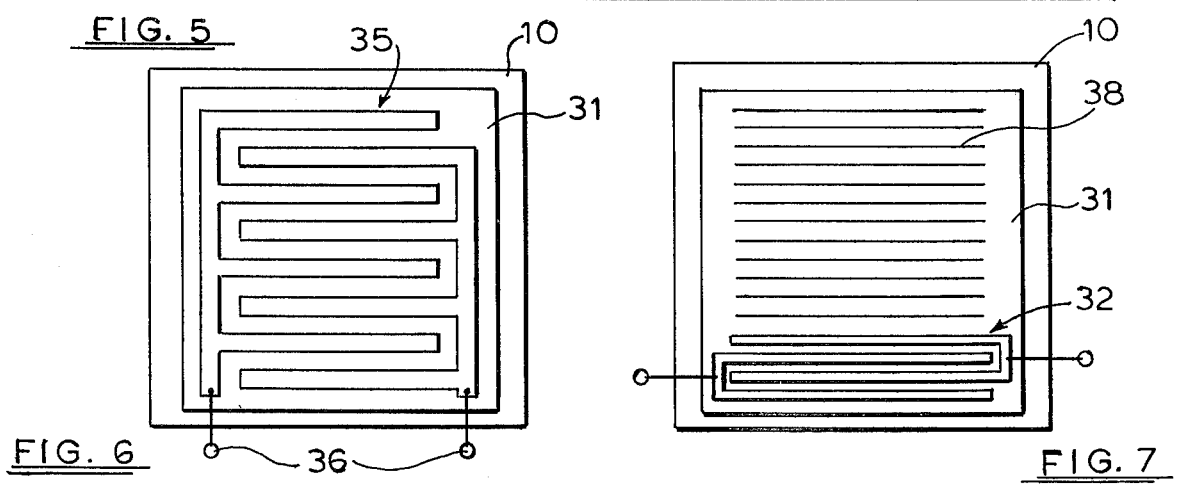
FIGS. 6 and 7 show, respectively, schematic presentations of at least two forms of light reflection control means which may be included in the embodiment of FIGS. 4 and 5.

Another means of establishing changes in the light reflecting characteristics of materials forming a light reflecting interface at one or more of the reflection points 21, 22, 23 and 24 is shown in FIG. 6. The layer 31, having a thickness of 1-micron, as an example, may also be of lithium niobate sandwiched between member 10 material and an interdigital electrode structure 35, having terminal means 36 to which voltages can be applied. Application of voltages produces corresponding spatial modulation of the refractive index of the layer 31 material and thereby produces an induced stationary diffraction grating to light incident on the interface of member 10 and layer 31 materials. The grating 38 thereupon effects a redirecting of light from the initial point 27 to positions along the scan-line in accordance with the potential of voltages being applied to the terminal means 36. Either the member 10 or the layer 31 may be of a piezoelectric effect material, or any one of a number of other Kerr or Pockels effect materials in which the required periodic variations of index of refraction can be induced. Under each set of a wide variety of material and operating conditions any of the above means utilized in the establishing of diffraction gratings as the reflection control means will be oriented in relation to the light paths 18 accordingly, effecting the most efficient grazing angles for the control means.

It may be well to point out that each of the illustrations in the drawings are, of course, not drawn so as to represent actual sizes or configurations, but drawn only to help simplify explanations of the invention. Although not shown in FIG. 1, nor in FIG. 2, the external light deflection control means referred to for providing the angular changes represented by the paths 20 to 20a can be of the type described in connection with the FIG. 7 illustration.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those skilled in the arts, but still being within the scope of the appended claims.

I claim:

1. In a light beam position control system:
    (a) a source of light;
    (b) an array of light reflecting surfaces;
    (c) means for directing light from said source along an input path toward said array of surfaces and thereupon along an optical path within said array extending to a light emitting surface of said array, said light input path optically related through said array to a light output path stemming from said emitting surface, said reflecting surfaces of said array each presenting a length dimension, said emitting surface extended along said length dimension and coinciding with a predetermined one of said reflecting surfaces, each surface of said array angularly oriented one with respect to the other for allowing light directed along said optical path to follow a helix of plural revolutions while undergoing a series of light reflections therein and for allowing said light during a predetermined one of said revolutions to be directed toward said emitting surface at an angle of incidence thereon for effecting a frustrating of a reflection of light therefrom;
    (d) means for directing light from said source along a first optical path within said array of surfaces so as to allow said light to be reflected toward and incident upon a first light output position along said light emitting surface; and
    (e) means for redirecting light from said source from said first optical path to and along a second optical path within said array of surfaces so as to allow said light to be reflected toward and incident upon a second light output position along said light emitting surface.

2. The invention as set forth in claim 1, wherein said last stated means includes light reflection control means intermediate said source of light and said array of reflecting surfaces for effecting said redirecting of light from said source from said first optical path to and along said second optical path and thereby allowing said light to be reflected toward and incident upon said second light output position along said light emitting surface.

3. The invention as set forth in claim 1, wherein said last stated means includes light reflection control means operatively associated with said array of surfaces along said optical path therein for effecting said redirecting of light from said source from said first optical path to and along said second optical path and thereby allowing said light to be reflected toward and incident upon said second light output position along said light emitting surface.

* * * * *